July 31, 1928.
H. SVANOE
1,678,964
PROCESS FOR TEMPERATURE CONTROL IN THE SYNTHETIC
PRODUCTION OF AMMONIA AND THE LIKE
Filed April 3, 1926
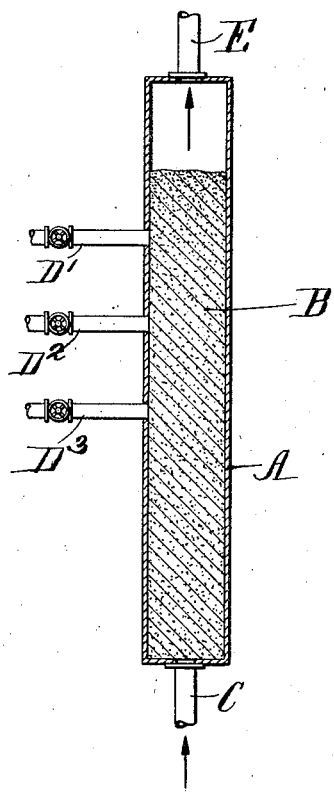
Inventor
Hans Svanoe
By his Attorneys
Cooper, Kerr & Dunham Patented July 31, 1928.

1,678,964

UNITED STATES PATENT OFFICE.

HANS SVANOE, OF NIAGARA FALLS, NEW YORK, ASSIGNOR TO THE AMMONIA CORPORATION, OF NEW YORK, N. Y., A CORPORATION OF NEW YORK.

PROCESS FOR TEMPERATURE CONTROL IN THE SYNTHETIC PRODUCTION OF AMMONIA AND THE LIKE.

Application filed April 3, 1926. Serial No. 99,488.

In the synthesis of ammonia from nitrogen gas and hydrogen gas there is an accompanying evolution of heat. The reaction often proceeds with great velocity accompanied with an enormous evolution of heat particularly when the gases are under a pressure of several hundred atmospheres and when the right condition of temperature and catalyst are present. This intense reaction will tend to increase the gas temperature and as an increased gas temperature will lower the efficiency of the system and will also be detrimental to the catalytic material, it is of great importance in some systems to be able to dissipate this heat and keep the temperature gradient through the catalyst as low as possible. While apparatus for ammonia synthesis may be designed for certain conditions to operate with a low temperature gradient through the catalytic material, certain variations in operating conditions may occur with certain systems and processes which may bring about the establishment of temperature differences which are not favorable for the catalytic material. Attempts have been made to overcome these undesirable effects in various ways, for example, a part of the gases to be treated of the same composition as the main gas stream are sent directly over the catalyzer without previously heating such gases by passage through a heat exchanger. However, such expedients are not entirely satisfactory.

The present invention is directed to a novel method of temperature control in gas synthesis and more particularly in ammonia synthesis processes to the general end that a better and more efficient control of temperature and of the reaction may be secured than heretofore.

The drawing shows a diagrammatic illustration of a catalyzer unit in which the novel method may be practiced.

Referring to the diagrammatic illustration A is a tube or bomb containing catalytic material B. The diagram omits the usual details of construction of the bomb, such as the pressure sustaining tube, the heating element, corrugated tube and the like. The particular design of these parts may be of any desired form. A part of the gas is admitted at C and other gas is admitted at $D'$, $D^2$ and $D^3$. All the gas including the ammonia which is produced leave at E.

I have discovered that the difference in thermal conductivity of nitrogen and hydrogen offers an entirely new and more efficient way to regulate the temperature of the gases over the catalytic material. The thermal conductivity of hydrogen gas is about seven times larger than the thermal conductivity of nitrogen.

According to the law of mass reaction the best result in the synthesis of ammonia should be obtained when working with a gas mixture where the hydrogen and nitrogen gases are present in the proportion of 3:1 by volume. However, even a variation of several per cent in this ratio should hardly be noticed in the efficiency of the reaction according to the same law. However, a slight variation in the gas ratio produces a marked effect in the efficiency due to the difference in the thermal conductivity of the gas mixture which is established. This may be taken advantage of in the following manner.

The gas admitted to the first part of the catalytic material is far from the equilibrium point, the rate of ammonia formation is high and the heat developed per unit of volume is very great. At this stage it is important to dissipate the heat quickly in order to avoid detrimental temperature rises. This can be accomplished by admitting an initially entering gas mixture (as through C) with a high thermal conductivity, that is, a gas mixture containing more hydrogen than required according to the hydrogen nitrogen ratio of 3:1.

As the reaction proceeds through the catalytic material B the gases are approaching the equilibrium point, the rate of ammonia formation is lower and the heat developed per unit of volume is considerably less than during the first or earlier stages of the process.

In order not to dissipate too much heat at such later stage or stages the thermal conductivity can be decreased by admitting pure nitrogen gas or a gas mixture rich in nitrogen. Such supplemental gas can be admitted through the pipes $D'$, $D^2$ and $D^3$ which lead into the bomb at points which are successively more remote from the entrance conduit C. The amount of gas may be varied in any desired manner.

I further contemplate the introduction of gases of different quality through the various conduits D', D² and D³. The nitrogen hydrogen ratio can be varied to suit different operating conditions which arise in practice. Furthermore, pure nitrogen may be admitted through certain conduits and hydrogen and nitrogen mixtures in various ratios through other conduits.

When operating under much lower pressure conditions than usual it may be desirable to initially introduce a gas having a relatively higher nitrogen content in the earlier stages of the process. Thereafter supplemental hydrogen or a gas mixture relatively rich in hydrogen may be admitted to the catalyst at later stages of the reaction, such a method involving the relative variation of the nitrogen and hydrogen content is within the scope of my invention.

Hereafter in the claims the term "gas" will be considered to define broadly both an elemental gas or a mixture of one or more gases such as nitrogen and hydrogen.

What I claim is—

1. The method of controlling a gas synthesis, which comprises introducing to a catalyst a gas having a given heat conductivity for the initial stage of the reaction, and in further introducing to the catalyst at a later stage in the reaction a gas having a heat conductivity differing substantially and to a sufficient degree from that of the first mentioned gas as to materially control the reaction at the various stages by the wide variation in the heat dissipating character of the gas mixture.

2. The method of controlling a gas synthesis which comprises introducing to a catalyst for the stage of the reaction where the activity is intense a mixture of gases which have a relatively high heat conductivity and in further introducing to the catalyst at another stage where the reaction is normally less intense a gas having a relatively lower heat conductivity.

3. The method of controlling temperature in a catalyst in the synthetic production of ammonia which comprises introducing into the catalyst at one stage a mixture of hydrogen and nitrogen with the hydrogen content greater than the normal 3 to 1 ratio to obtain a gas mixture having relatively high heat conductivity and in subsequently introducing into the catalyst at a later stage additional nitrogen whereby a gas mixture is secured in said catalyst stage which has a relatively lower heat conductivity.

4. The method of gas synthesis which comprises reacting gas mixtures with a catalyst and in varying the relative contents of the gases constituting said mixture to provide relatively higher or lower heat conductivity of such mixtures of sufficient relative difference to effect a material controlling action upon the reaction at different points by the substantially different relatively higher or lower heat dissipating character of the mixture.

5. The method of controlling the temperature and reaction of an ammonia gas synthesis which comprises initially introducing to reaction in the presence of a catalyst a gas mixture which comprises an excess of hydrogen whereby high heat conductivity and a controlled reaction is secured and in subsequently introducing to reaction in the presence of a catalyst other gas containing supplemental nitrogen to modify the nitrogen content of the gas mixture whereby a relatively lower heat conductivity and further and more active reaction is secured.

6. The method of controlling an ammonia gas synthesis, which comprises reacting gas mixtures of hydrogen and nitrogen with a catalyst, and in modifying the relative contents of hydrogen and nitrogen reacting with the catalyst at different reaction points to control the character of the reaction substantially by the high heat conductivity and high heat dissipating characteristic of the hydrogen content of the gases while maintaining the efficiency of the reaction at different points substantially the same.

In testimony whereof I hereto affix my signature.

HANS SVANOE.